United States Patent [19]

Tamura et al.

[11] 4,298,947
[45] Nov. 3, 1981

[54] INTRABOX TEMPERATURE DISPLAY DEVICE

[75] Inventors: Hiroshi Tamura, Yokohama; Yutaka Nakaie, Kawasaki, both of Japan

[73] Assignee: Tokyo Shibaura Denki Kabushiki Kaisha, Kawasaki, Japan

[21] Appl. No.: 94,567

[22] Filed: Nov. 15, 1979

[30] Foreign Application Priority Data

Nov. 15, 1978 [JP] Japan .............................. 53-140837

[51] Int. Cl.³ .............................................. G01K 7/14
[52] U.S. Cl. ................................... 364/557; 364/575; 73/362 AR
[58] Field of Search ............................. 364/575, 557; 73/362 AR

[56] References Cited

U.S. PATENT DOCUMENTS

| 4,031,365 | 6/1977 | Raggiotti et al. | 364/557 |
| 4,114,442 | 9/1978 | Pratt | 364/557 X |
| 4,161,880 | 7/1979 | Prosky | 364/557 X |
| 4,199,817 | 4/1980 | Conkling et al. | 364/575 X |

Primary Examiner—Edward J. Wise
Attorney, Agent, or Firm—Oblon, Fisher, Spivak, McClelland & Maier

[57] ABSTRACT

An intrabox temperature display device converts a signal representing an intrabox air temperature detected by a molded temperature sensor placed in the intrabox of a refrigerator into a digital signal by means of an A/D converter. The intrabox temperature data detected having a succession of samples with given sampling periods is stored in a memory. The intrabox temperature data read out from the memory is averaged in an operation circuit. The averaged temperature data is displayed by a display section as the temperature data approximate to a real temperature for cooling or freezing foods in the refrigerator.

3 Claims, 12 Drawing Figures

| CODE | SEGMENT | CODE | SEGMENT |
|---|---|---|---|
| 1 1 1 1 | BLANK | 0 1 1 1 | 7 |
| 1 1 1 0 | E | 0 1 1 0 | 6 |
| 1 1 0 1 | H | 0 1 0 1 | 5 |
| 1 1 0 0 | ⊐ | 0 1 0 0 | 4 |
| 1 0 1 1 | ⊏ | 0 0 1 1 | 3 |
| 1 0 1 0 | — | 0 0 1 0 | 2 |
| 1 0 0 1 | 9 | 0 0 0 1 | 1 |
| 1 0 0 0 | 8 | 0 0 0 0 | 0 |

INTRABOX TEMPERATURE DISPLAY DEVICE

BACKGROUND OF THE INVENTION

1. Field of the Invention

This invention relates to an intrabox temperature display device for displaying a temperature approximate to a real temperature for cooling and/or freezing foods housed for preservation in a cooling compartment and/or a freezing compartment.

For preserving frozen foods now prevailingly marketed for a long term in a cooling chamber or a freezing chamber, it is desirable to display the cooling or the freezing temperature of the foods preserved in the chamber in a simple and easy manner.

2. Description of the Prior Art

In one of the conventional intrabox temperature display devices, an intrabox temperature detected by a temperature sensor attached to the inner wall of the intrabox, for example, is detected in the form of a voltage divided by the temperature sensor and a reference resistor connected in series with the sensor. The divided voltage is applied to an A/D converter where it is converted into a digital signal. The digital signal converted is then applied through a decoder to a display drive circuit. The signal outputted from the display drive circuit is used to drive a display device such as a three-digit LED display device for digitally displaying the signal representing the intrabox temperature detected.

The intrabox temperature displayed by the conventional display device as mentioned above is the temperature in the space of the cooling or freezing chamber and not the temperature of the foods per se, since the temperature sensor is merely attached on the wall of the chamber. Attempts have been made in which the temperature sensor is directly made to contact with the individual foods but has been unsuccessful in practical use. Further, an air temperature within the chamber irregularly changes when the door hingedly mounted is open and close and when the compressor is turned on and off. Therefore, the air temperature detected by the temperature sensor does not represent the correct or near temperature of the foods stored.

SUMMARY OF THE INVENTION

Accordingly, an object of the invention is to provide an intrabox temperature display device capable of measuring a temperature of the food stored in a cooling or a freezing chamber approximate to the intrabox air temperature of the cooling or the freezing chamber on the basis of the temperature data having a succession of samples detected by a temperature sensor placed within the chamber, irrespective of the open and close operations of a door hindgedly mounted to the cooling chamber or the freezing chamber and the turn on and off the compressor.

To achieve the above object of the invention, there is provided an intrabox temperature display device comprising: a temperature sensor disposed within an intrabox and for sensing a temperature of an air within an intrabox; an A/D converter for converting an analog signal representing an intrabox temperature detected by the temperature sensor into a digital signal; a memory for sequentially storing the detected data of the intrabox temperature with a succession of samples obtained through the A/D converter; an operation circuit for averaging the detected data with a succession of samples read out from the memory to produce average temperature digital data; a decoder connected to said operation circuit to read out the temperature data stored at a memory location specified by an address signal of the averaged temperature digital data; and display means for displaying the temperature data read out from said decoder as the temperature approximate to the temperature of the food stored in the intrabox.

With such a construction, the intrabox temperature display device may measure a temperature of the food stored in a cooling or a freezing chamber approximate to the intrabox air temperature of the cooling or the freezing chamber on the basis of the temperature data having a succession of samples detected by a temperature sensor placed within the chamber, irrespective of the open and close operations of a door hindgedly mounted to the cooling chamber or the freezing chamber and the turn on and off the compressor. Further, the intrabox temperature display device is simple in the construction without any special temperature compensating control. By merely storing a conversion tape into a ROM 28, temperature may be detected at a plurality of positions in the chamber by a plurality of temperature sensors. Moreover, in the intrabox temperature display device, the average value of the detected temperature is sequentially obtained for each incoming sample value, so that a temperature to be displayed is updated with time and therefore is fairly reliable.

BRIEF DESCRIPTION OF THE DRAWINGS

Other objects and features of the invention will be apparent from the following description taken in connection with the accompanying drawings, in which.

Now an embodiment of an intrabox temperature display device according to the present invention will be described in detail in conjunction with the accompanying drawings.

DETAILED DESCRIPTION OF THE PREFERRED EMBODIMENTS

Figure 1:
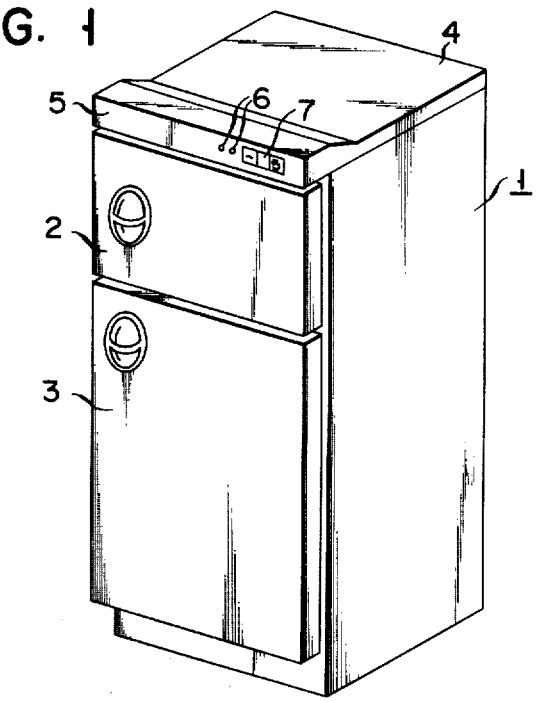
FIG. 1 shows a perspective view of a freezing/cooling refrigerator to which an intrabox temperature display device according to the invention is applied.

In practical use, the intrabox temperature display device of the invention is assembled into a freezing-/cooling refrigerator of two-door type as is shown in perspective in FIG. 1, for example, and is capable of detecting either temperature in a cooling chamber or in a freezing chamber through the switching operation of a switching device. The freezing/cooling refrigerator 1 shown in FIG. 1 has a freezing chamber at the upper portion with a hinged door 2 and a cooling chamber at the lower portion with hinged door 3. On a front side 5 of a top plate, a switching device is provided to select the temperature in the freezing chamber or the cooling chamber through its switching operation. The temperature selected is digitally displayed on a 3-digit LED numerical display board 7.

Figure 2:
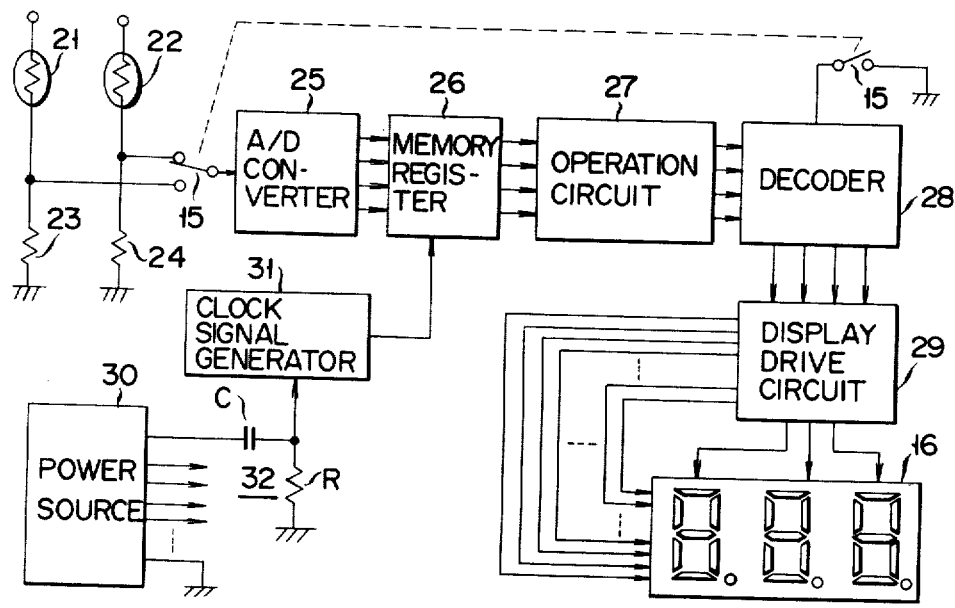
FIG. 2 shows a block circuit diagram of the intrabox temperature display device which is an embodiment according to the invention.
Figure 3:
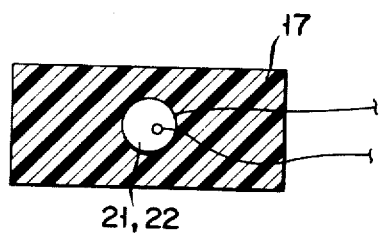
FIG. 3 shows a cross sectional view of a temperature sensor used in the present invention.

Turning now to FIG. 2, there is shown in block form a circuit arrangement of the intrabox temperature display device of the invention. A series circuit including a thermistor 21 and a reference resistor 23 connected at one end to ground is disposed in the freezing chamber. Another series circuit including a thermistor 22 and a reference resistor 24 grounded at one end is similarly disposed in the cooling chamber. When a fixed voltage is applied across each of the series circuit, the resistor value of the corresponding thermistor 21 or 22 changes in accordance with the temperature within the corresponding chamber. The value of the temperature is taken out as a voltage divided by the temperature sensor and the reference resistor 23 or 24. The switching operation of the switch 15 selects either temperature in the freezing chamber or the cooling chamber for its display. The thermistor 21 or 22 is molded with synthetic resin 17 as shown in FIG. 3 to form a temperature sensor. In manufacturing the temperature sensor, the thicker the thickness of the synthetic resin layer, the larger the thermal capacity of the sensor, so that the temperature sensed by the temperature sensor approximates the temperature of foods stored in the chambers. In this case, however, the temperature sensor is bulky and, therefore, this approach is undesirable. Alternately, it is conceivable to mold the thermistor 21 or 22 with material merely with large thermal capacity; however, this approach causes the thermistor to be expensive. Consequently, the thickness of the synthetic resin to provide some amount of the thermal capacity is sufficient for the thickness of the synthetic resin layer used in this embodiment.

The divided voltage, or the detected temperature data, is applied to an A/D converter 25 via the switch 15. The temperature data is sequentially digitized with given sampling periods, for example, one-second intervals and is inputted to and temporarily stored in a memory register 26. Sample data stored in the memory register 26 is read out by clock signals from a clock signal generator 31. The oscillation of the clock signal generator 31 starts in response to a signal from a differentiation circuit 32 including a capacitor C and a resistor R which are energized by a power source 30. A given number of sequential sample data read from the memory register 26 are inputted to an operation circuit 27 where those are averaged. The averaged digital signal value is inputted as an address signal to a decoder 28 to read out information of the corresponding temperature value stored beforehand in the memory location. The temperature value information read out is applied to a display drive circuit 29 to drive a selected display segment of the display device 16 to luminesce, and to display digitally the intrabox temperature detected by the temperature sensor. At that time, to select the intrabox temperature in the freezing chamber or in the cooling chamber, the corresponding location of the decoder 28, e.g. the ROM, is selected by operating the switch 15 interlocked with the input switch 15 for the A/D converter 25.

As described above, a given number of sample data detected by the temperature sensor are converted by the A/D converter 25, and then inputted through the memory register 26 to the operation circuit 27 where they are averaged. Explanation will next be made in detail of such an operation with reference to FIGS. 4 to 7.

The A/D converter 25 receives the detected temperature data inputted through the switching operation of the switch 15 every second and converts the data to 4-bit digital signals. The 4-bit digital signals correspond to the detecting temperatures in the freezing chamber and in the cooling chamber as shown in Table 1.

TABLE 1

| Temp. in Cooling Chamber | Temp. in Freezing Chamber | Digitized Output |
|---|---|---|
| −25 (°C.) | −5 (°C.) | 0 |
| −24 | −4 | 1 |
| −23 | −3 | 2 |
| −22 | −2 | 3 |
| −21 | −1 | 4 |
| −20 | 0 | 5 |
| −19 | 1 | 6 |
| −18 | 2 | 7 |
| −17 | 3 | 8 |
| −16 | 4 | 9 |
| −15 | 5 | 10 |
| −14 | 6 | 11 |
| −13 | 7 | 12 |
| −12 | 8 | 13 |
| −11 | 9 | 14 |
| −10 | 10 | 15 |

Figure 4:
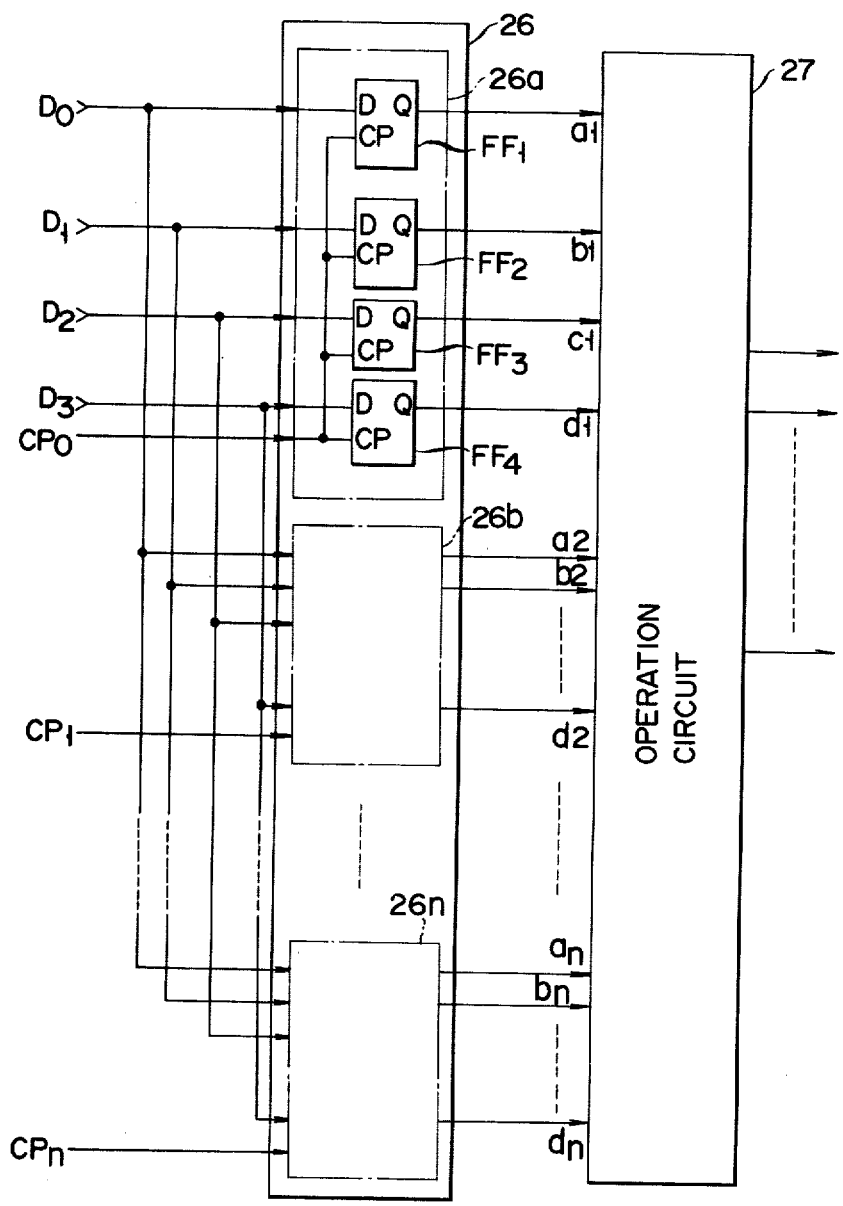
FIG. 4 shows a block diagram of a memory register circuit arrangement connecting to an operation circuit shown in FIG. 2.
Figure 6:
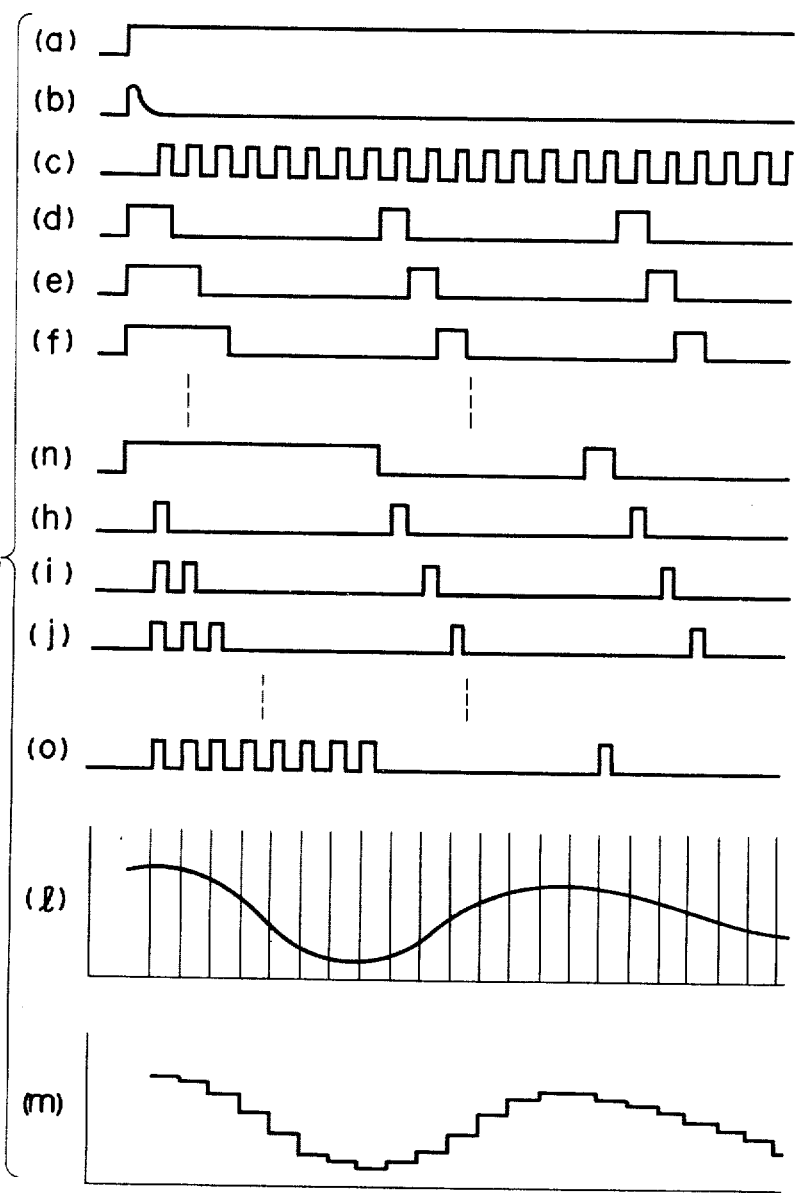
FIGS. 6(a) to 6(f), 6(n), 6(h) to 6(j), 6(o) and 6(l) to 6(m) show timing charts for illustrating the timing the clock signal generated by the clock signal generator and the sample hold operation latched by the memory register.

As shown in FIG. 4, the 4-bit digital signal per sample is inputted to a memory register 26 including latch circuits 26a to 26n, and the read-out of the bit data stored in the register 26 is controlled by clock signals from the clock signal generator 31. The sampled data read out from the memory register 26 is operated upon to be averaged. In the embodiment, each of the latch circuits 26a to 26n is comprised of four D-type flip-flops $FF_1$ to $FF_4$ which are disposed in parallel with each other. To D terminals of the D-typed flip-flops are inputted the bit data $D_0$ to $D_3$ of 4-bit per sample, respectively. A clock signal $CP_0$ from the clock signal generator 31 is inputted to the CP terminals of the D-type flip-flops $FF_1$ to $FF_4$ of the latch circuit 26a. Similarly, the other clock signals $CP_1$ to $CP_n$ are inputted to the CP terminals of the other latch circuits 26b to 26n, respectively, at given timings. Each of the inputted bit data is latched per sample.

Figure 5:
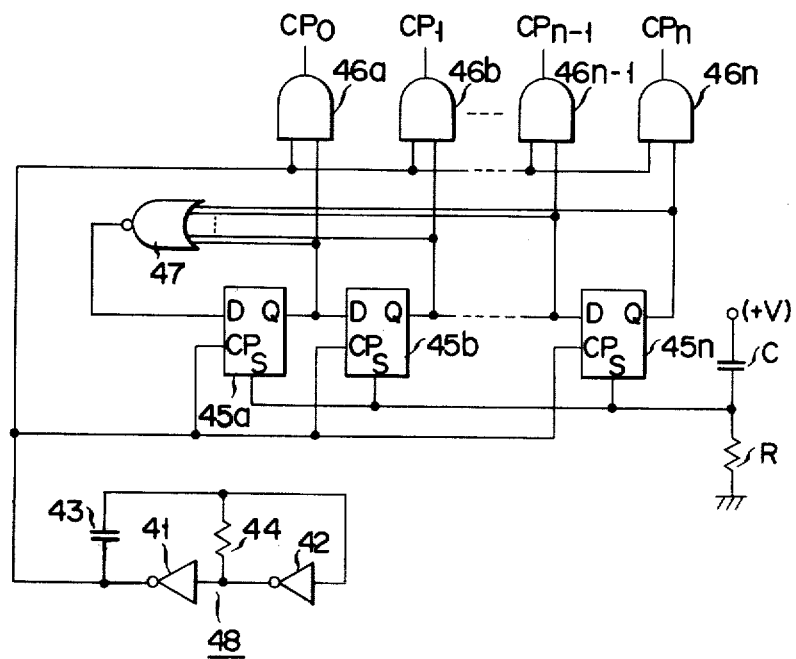
FIG. 5 shows a circuit diagram of a clock signal generator shown in FIG. 2.

The circuit construction of the clock signal generator 31 is as shown in FIG. 5, for example. 2-stage inverter circuits 41 and 42 arranged in cascade fashion, having a capacitor 43 and a resistor 44 in the feedback loops, form an astable multivibrator, i.e. an oscillator 48. Clock pulses outputted from the oscillator 48 are inputted to CP terminals of the D-type flip-flop circuits 45a to 45n, and at the same time inputted to one of the gate terminal of each gate circuit 46a to 46n.

The gate circuits 46a to 46n are correspondingly connected to the D-type flip-flop circuits 45a to 45n, respectively, of which Q output terminals are connected to the other gate terminals of the gate circuit 46a to 46n, respectively. The D-type flip-flop circuits 45b to 45n are so arranged that the Q outputs of the prestage circuit are connected to the D terminals of the poststage circuit, as shown. The Q output signals from the flip-flop circuits 45b to 45n, which are logically summed by a NOR circuit 47, are fed back to the D terminal of the flip-flop circuit 45a. When the power source 30 as shown in FIG. 2 is turned on and a set signal shown in FIG. 6(a) is produced, the set signal is inputted to the clock signal generator 31 to set all the flip-flop circuits 45a to 45n which in turn produce output signals as shown in FIGS. 6(d) to 6(n). Then, the clock signal generated by the oscillator 48 is applied to one of the input terminals of the gate circuits 46a to 46n (FIG. 6(c)). Accordingly, in response to the first clock signal, the gate circuits 46a to 46n produce clock signals $CP_0$ to $CP_n$ as shown in FIGS. 6(h) to 6(o). Simultaneously, the first clock signal resets the D-type flip-flop circuit 45a to produce an output signal as shown in FIG. 6(d). Subsequently, the successive clock signals from the oscillator 48 reset the flip-flop circuits 45b to 45n which in turn produce an output signal as shown in FIGS. 6(e) to 6(n). Until the output signal of the flip-flop circuit 45b becomes zero (FIG. 6(e)), the gate circuit 46b produces the output signal (FIG. 6(i)) in response to the incoming clock signal from the oscillator 48. Similarly, the gate circuit 46c produces the clock signal (FIG. 6(j)) until the output signal from the flip-flop circuit 45c becomes zero (FIG. 6(f)). Further, the gate circuit 46n produces the clock signal (FIG. 6(o)) until the output signal from the flip-flop circuit 45n (FIG. 6(n)). In this manner, when the flip-flop circuits 45a to 45n are all reset, the NOR circuit 47 produces an output signal to set again the first flip-flop circuit 45a which in turn produces an output signal (FIG. 6(d)). Upon the production of the output signal, the gate circuit 46a receives the clock signal from the oscillator 48 as its gate input signal to produce again the clock signal $CP_0$ (FIG. 6(h)). The D-type flip-flop circuit 45a is set to produce an output signal which in turn is inputted to the gate of the gate circuit 46a. Then, if the clock signal from the oscillator 48 is inputted to the other gate of the gate circuit 46a, the gate circuit 46a produces a clock signal (FIG. 6(h)). The succeeding D-type flip-flop circuits 45b to 45n are sequentially set by the Q output signal of the prestage circuit, and then the gate circuits 46b to 46n similarly produce clock signals in response to clock signals from the oscillator (FIGS. 6(i) to 6(o)). As described above, the clock signals $CP_o$ to $CP_n$ are repeatedly outputted from the gate circuits 46a to 46n with given periods and serve as corresponding latch drive signals for the latch circuits 26a to 26n of the memory register 26 shown in FIG. 4. In the embodiment, the bit data of eight samples, each sample having four bits, are latched by the memory register 26. Therefore, the latch circuit 26n in FIG. 4 indicates the 8th latch circuit 26h; the D-type flip-flop circuit 45n shown in FIG. 5 indicates the 8th D-type flip-flop circuit 45h; the gate circuit 46n indicates the 8th gate circuit 46h. The first sample is latched in all the latch circuits when the clock signals $CP_0$ to $CP_8$ are simultaneously applied to the latch circuits 26a to 26h, as shown in FIGS. 6(h) to 6(o). The second sample is latched when the clock signals $CP_1$ to $CP_8$ are applied to the remaining latch circuits 26b to 26h. The sample is latched in the remaining latch circuits 26c to 26h, similarly. The final sample is latched in the 8th latch circuit 26h in response to the clock signal $CP_8$. The successive samples following the 8th sample, respectively, are latched in the latch circuits 26a, 26b, 26c, . . . in response to the corresponding clock signals $CP_0$, $CP_1$, $CP_2$, . . . , as shown in FIGS. 6(h), 6(i), 6(j), . . . .

Figure 7:
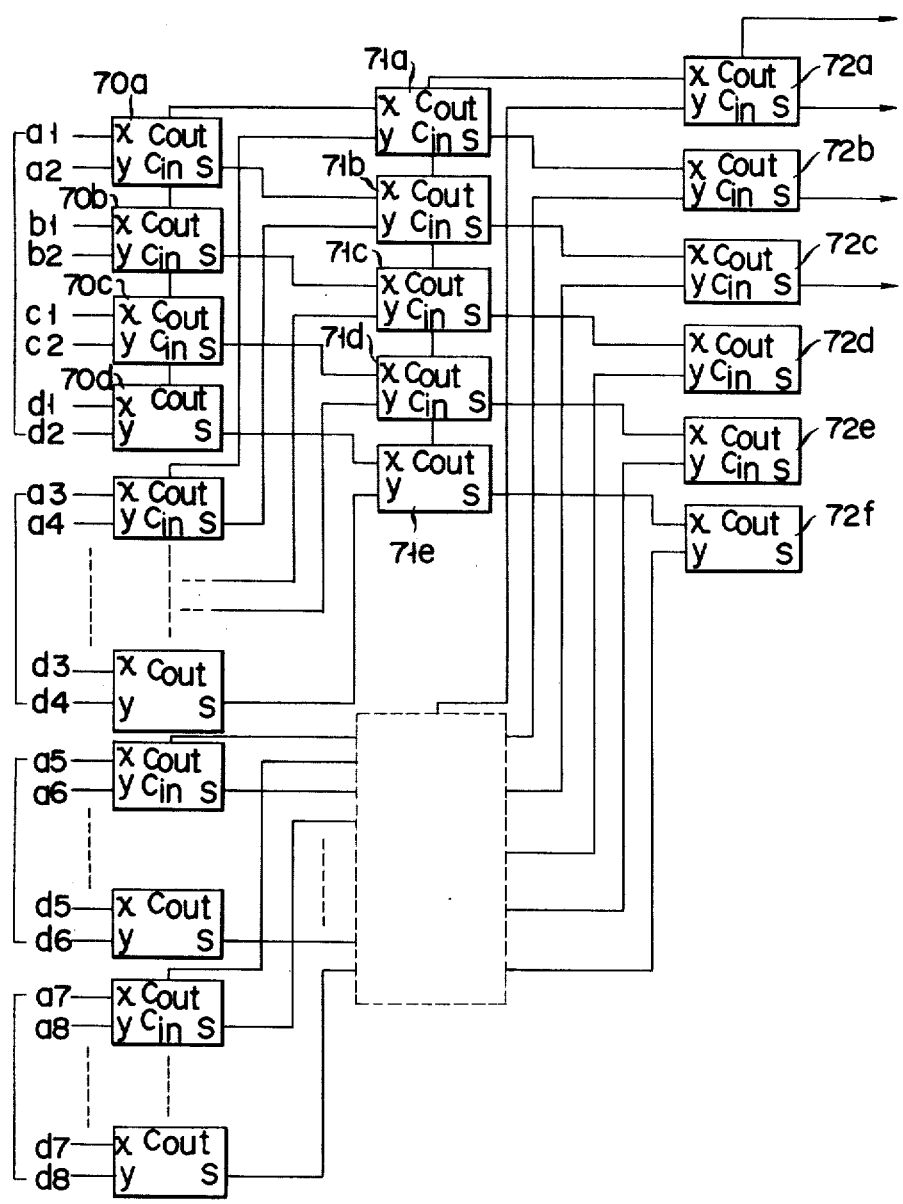
FIG. 7 shows a block diagram of the operation circuit used in the circuit shown in FIG. 2.

As described above, the detected temperature data as shown in FIG. 6(l) is latched as the digitized signal as shown in FIG. 6(m) in a given latch circuit of the memory register 26 every the plural sample data. The 4-bit latch outputs ($a_1$, $b_1$, $c_1$, $d_1$), ($a_2$, $b_2$, $c_2$, $d_2$), . . . ($a_n$, $b_n$, $c_n$, $d_n$) produced from the respective latch circuits 26a, 26b, . . . of the memory register 26 are summed in the operation circuit 27 and the circuit 27 then produces a digital signal of 7 bits. The operation circuit 27 may be constructed as shown in FIG. 7, for example.

Figure 8:
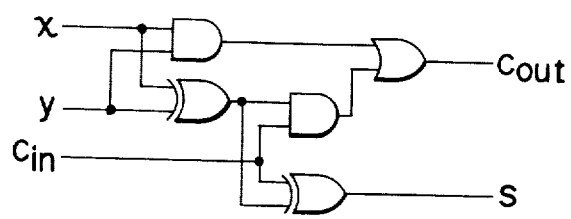
FIG. 8 shows a circuit diagram of a full adder used in the circuit shown in FIG. 7.

With respect to the digital data $D_0$ which is the first sample data of 4 bits, the output signal $a_1$ from the first D-type flip-flop circuit FF1 of the first latch circuit 26a and the output signal $a_2$ from the first D-type flip-flop circuit FF1 of the second latch circuit 26b are summed in the first full adder 70a. Similarly, the output signals $b_1$ and $b_2$ of the flip-flops at the corresponding stage in the first and second latch circuits are summed by the second full adder 70b, and the output signals $c_1$ and $c_2$ from the corresponding flip-flops are summed by the third full adder 70c. The output signals $d_1$ and $d_2$ from the flip-flop circuits FF4, corresponding to the final bit of the bit data, are summed by a half adder circuit 70d. Subsequently, the output signals from the flip-flop circuits at the corresponding stage in the adjacent latch circuits are summed in the similar way. Through this addition operation, the eight samples of 32 bits are converted into a signal of 20 bits at the first addition stage including the adders 70a, 70b, . . . . The 20-bit signal is then converted into a signal of 12 bits at the second addition stage including full adders 71a to 71d and a half adder 71e. The 12-bit signal is then converted into a signal of 7 bits at the third addition stage including full adders 72a to 72c and a half adder 72f. The circuit construction of the full adder is known like the one shown in FIG. 8 and hence no further description of it will be made.

By discarding the lower 3 bits of the 7-bit output signal and setting the 4th bit of the 7th bit signal to the least significant digit, a value obtained by dividing by 8 the 7-bit signal, or, that is to say, the summed value of the 4-bit data of the first sample may be obtained as a digital signal. Then, the first sampling value and the second sampling value latched in the remaining latch circuits 26b to 26h are averaged. After this averaging step, the average value of the first and second sampling values, and the third sampling value latched in the remaining latch circuits 26c to 26h are averaged. In this manner, the average value of the first to seventh sampling values and the 8th sampling value are averaged and latched in the last latch circuit 26n. With respect to the sampling values succeeding to the 8th sampling value, the 4-bit data are successively read out from the corresponding latch circuits every one sample of 4 bits and the eight sampling values thus read out are added in the operation circuit 27 to produce a 7-bit output signal. And further the average value of the eight samples may be obtained by using the upper four bits of the sampling data or values. In this way, a succession of n samples of the detected temperature data may be taken out. For example, when the desired temperatures in the cooling chamber are −3° C., 1° C., 3° C., 5° C., 8° C., 4° C., 2° C., and −1° C., the digital values corresponding to those temperature values are as shown in Table 2.

TABLE 2

| Temperature | Digital Value | Sum | Average |
|---|---|---|---|
| −3 (°C.) | 0010 | | |
| 1 | 0110 | | |
| 3 | 1000 | | |
| 5 | 1010 | 0111010 | 0111 |
| 8 | 1101 | | |
| 4 | 1001 | | |
| 2 | 0110 | | |
| −1 | 0100 | | |

The aforementioned eight digital values are added together, thus obtaining a sum "10111010." The upper four bits of the sum can be regarded as the average value of the eight digital values which might otherwise be obtained by dividing "0111010" by 8.

Figure 9:
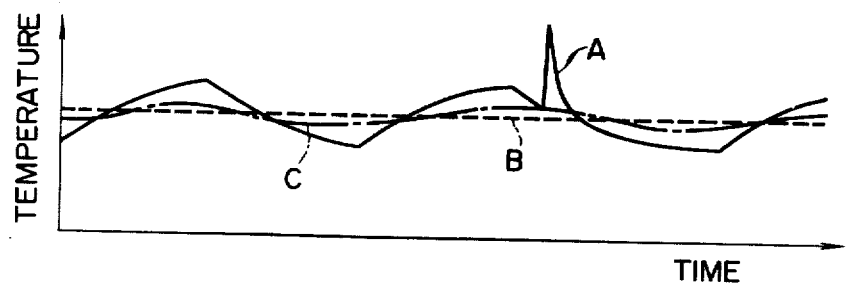
FIG. 9 shows plots of the temperature response versus time of the inside of the cooling chamber of the food stored and of the sensor FIG. 10 schematically illustrates the structure of a decoder used in the circuit shown in FIG. 2.

The digital value average is the detected temperature smoothed and is approximate to the temperature of the food stored in the chamber. As shown in FIG. 9, the air temperature within the cooling or the freezing chamber greatly changes when the door is opened and closed or when the compressor is turned on and off, as indicated by continuous line A. However, the temperature of the food stored varies only slightly, being little affected by the air temperature within the chamber, as shown in dotted line B since it has a large heat capacity. The temperature sensor according to the invention is molded by the synthetic resin as mentioned above to have an increased heat capacity. Further, a plurality of sampling values are averaged in the present invention. Therefore, the detected temperature sensed by the sensor and displayed by the display unit little changes as indicated by one-dot chain line C, irrespective of the open and close operations of the door and the turning-on and -off of the compressor, and the temperature approximates the temperature of the food within the chamber.

Figure 10:
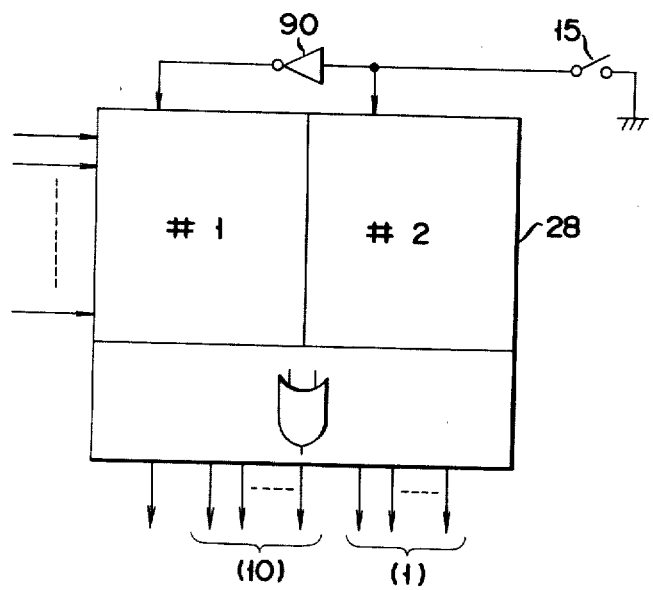

The average value of the detected temperature thus obtained is inputted as address designating information to the ROM 28, as shown in FIG. 10. The two addresses #1 and #2 of the ROM 28 store the data representing the temperature detected by the thermistor 21 and the data representing the temperature detected by the thermistor 22 respectively. The insertion of an inverter 90 between the ROM 28 and the switch 15 enables the selection of the address #1 or #2. Temperature values stored in the addresses #1 or #2 are related to the averaged digital values, as shown in Table 3.

TABLE 3

| Average Digitized Value | #1 | #2 |
|---|---|---|
| 15 | −10 | 10 |
| 14 | −11 | F9 |
| 13 | −12 | F8 |
| 12 | −13 | F7 |
| 11 | −14 | F6 |
| 10 | −15 | F5 |
| 9 | −16 | F4 |
| 8 | −17 | F3 |
| 7 | −18 | F2 |
| 6 | −19 | F1 |
| 5 | −20 | F0 |

TABLE 3-continued

| Average Digitized Value | #1 | #2 |
|---|---|---|
| 4 | −21 | A1 |
| 3 | −22 | A2 |
| 2 | −23 | A3 |
| 1 | −24 | A4 |
| 0 | −25 | A5 |

As seen from the above table, when the thermistor 21 in the freezing chamber, for example, is selected by the switch 15, and the averaged value of the detected temperature is "5," the temperature data of −20 is read out from the address #1 of the ROM 28. When the thermistor 22 in the cooling chamber is selected by the switch 15, and the digital value averaged of the detected temperature is "11," the temperature data of F6 is read out from the address #2. Here, F of the F6 indicates that the upper digits from 6 are blanked. In this way, the averaged digital data is applied to the display drive circuit 29 as the temperature display data including the 1st digit and the 10th digit corresponding to the temperature detected by the thermistors 21 and 22.

Figures 11, 12:
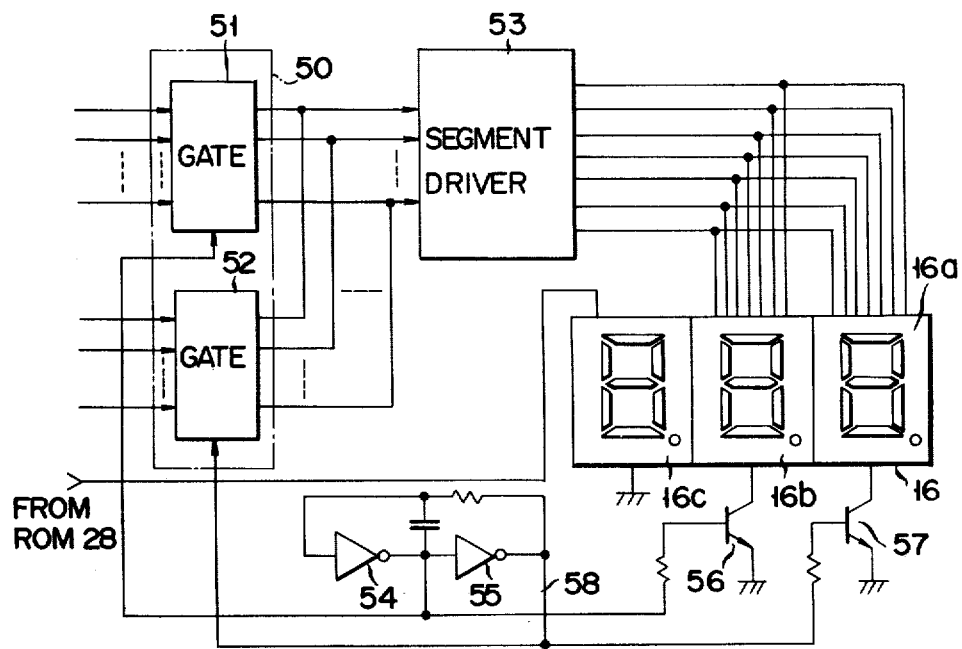
FIG. 11 shows a circuit diagram of a display drive circuit shown in FIG. 2 and its related display section.
FIG. 12 shows a table tabulating comparatively codes and display segments of the display section driven by the corresponding codes.

As shown in FIG. 11, the display drive circuit 29 is comprised of a multiplexer 50 including a gate circuit permitting a digital signal of the numerical data at the fourth digit of the temperature display data read out from the ROM 28 to pass therethrough, and a gate circuit 52 to permit the digital signal of the numerical data at the first digit, and a segment driver 53 for producing drive signals at the respective digits of a display unit 16 in response to the digital signal. The display device 16 is comprised of a display section 16a at the first digit, a display section 16b at the 10th digit, and a display section 16c connected to the ROM 28 for displaying BLANK F or a minus symbol A. The gate circuits 51 and 52 are connected at the gate to an oscillator 58 including the inverters 54 and 55. The output signal from the oscillator 58 is used to alternately select the gate circuit 51 or 52. The display section 16b of the 10th digit of the display device 16 is coupled with a transistor 56 and the display section 16a of the 1st digit is coupled with a transistor 58. Those display sections are further connected to the oscillator 58 through those transistors and are alternately enabled to effect the display operation. The digital code is supplied from the ROM 28 to the display drive circuit 29, causing the circuit 29 to produce drive signals for the corresponding display sections, as shown in FIG. 11. As shown in FIG. 12, a code "1010," a 10th digit code "0010," and a 1st digit code "0001" are read out from the ROM 28, the display sections 16c, 16b and 16a cooperate to display "−20." Accordingly, one can learn that the temperature in the cooling chamber is −20° C. When a code "1111" corresponding to F6 and a code "0110" of the first digit are read out from the ROM 28, the display section 16a displays "6." This display means that the temperature within the cooling chamber is 6° C. In this manner, the temperature within the intrabox of the refrigerator is displayed.

In a modification of the embodiment of the invention, a varistor may be used for the temperature sensor. The shift register of n-bit and m stage may be used for the memory register, corresponding to the number of bits representing the detected temperature. Further, a series of operation controls may be performed by a one-chip computer (CPU) for effecting a micro-process control.

Display elements such as liquid crystal display elements and plasma display elements may be used for the display device in the above-mentioned embodiment. In the embodiment as mentioned above, by discarding the lower 3 bits of the digital sum value of eight samples, the sum value divided by 8 is obtained. However, by discarding the lower four bits of the digital sum value of 16 samples, the average value divided by 16 may be obtained in place of the above case. If necessary, the circuit may be constructed such that the sum of N samples is divided by N, although the circuit construction might be complicated.

While a preferred embodiment has been described, variations thereto will occur to those skilled in the art within the scope of the present inventive concepts.

What is claimed as new and desired to be secured by Letters Patent of the United States:

1. An intrabox temperature display device comprising:

a temperature sensor disposed within an intrabox for sensing a temperature of an air within the intrabox;

an A/D converter for converting a signal representing the intrabox temperature detected by said temperature sensor into a digital signal;

memory means comprised of n latch circuits and connected to receive clock signals from a clock signal generator in a given timing to sequentially latch n samples and store a succession of n samples each including n bits which are A/D converted by said A/D converter;

an operation circuit for averaging the detected data with a succession of samples read out of said memory means to produce averaged temperature digital data;

decoder means connected to said operation circuit to read out the temperature data stored at a memory location by an address signal of the averaged temperature digital data; and display means for displaying the temperature data read out of said decoder means as a temperature approximate to a temperature of a food in the intrabox.

2. An intrabox temperature display device according to claim 1, wherein said operation circuit sums the detected temperature information including a plurality of samples digitized and produces averaged temperature information through a bit-shift processing.

3. An intrabox temperature display device according to claim 1, wherein said operation circuit is comprised of first stage addition circuit means having a combination of a plurality adder circuits and a half adder circuit for summing corresponding output signals from latch circuits, second stage addition circuit means having a combination of a plurality of full address and a half adder circuits for summing corresponding output signals from said first stage addition circuit means, and third stage addition circuit means having a combination of a plurality of full adder circuits and half adder circuit for summing corresponding output signals from said second stage addition circuit means to produce only a given bit output signal, which is the digital data averaged of n samples inputted to said first stage addition circuit means.

* * * * *